(12) United States Patent
Dupont et al.

(10) Patent No.: US 10,705,400 B2
(45) Date of Patent: Jul. 7, 2020

(54) REFLECTING CELL WITH MODULABLE REFLECTIVITY

(71) Applicants: NEXTER SYSTEMS, Roanne (FR);
INSTITUT MINES TELECOM—IMT ATLANTIQUE—BRETAGNE—PAYS DE LA LOIRE, Brest (FR)

(72) Inventors: Laurent Dupont, Bourges (FR);
Suman Manna, Bourges (FR)

(73) Assignees: NEXTER SYSTEMS, Roanne (FR);
INSTITUT MINES TELECOM-IMT ATLANTIQUE-BRETAGNE-PAYS DE LA LOIRE, Brest (FR)

( * ) Notice: Subject to any disclaimer, the term of this patent is extended or adjusted under 35 U.S.C. 154(b) by 225 days.

(21) Appl. No.: 15/523,489

(22) PCT Filed: Oct. 22, 2015

(86) PCT No.: PCT/FR2015/052843
§ 371 (c)(1),
(2) Date: May 1, 2017

(87) PCT Pub. No.: WO2016/066931
PCT Pub. Date: May 6, 2016

(65) Prior Publication Data
US 2017/0307927 A1 Oct. 26, 2017

(30) Foreign Application Priority Data
Oct. 31, 2014 (FR) ..................................... 14 02485

(51) Int. Cl.
*G02F 1/137* (2006.01)
*G02F 1/1343* (2006.01)
(Continued)

(52) U.S. Cl.
CPC .......... *G02F 1/13718* (2013.01); *G02F 1/135* (2013.01); *G02F 1/1335* (2013.01);
(Continued)

(58) Field of Classification Search
CPC ............... G02F 1/13718; G02F 1/1343; G02F 2001/133742; G02F 1/1335; G02F 1/135
See application file for complete search history.

(56) References Cited

U.S. PATENT DOCUMENTS

| 7,630,029 B2 | 12/2009 | Majumdar et al. |
| 2006/0066803 A1 | 3/2006 | Aylward et al. |
| 2006/0262245 A1* | 11/2006 | Burberry ........... G02F 1/133707 349/86 |

(Continued)

FOREIGN PATENT DOCUMENTS

| EP | 0 582 656 B1 | 4/1999 |
| FR | 2 957 684 B1 | 8/2012 |
| WO | 2012/051127 A2 | 4/2012 |

OTHER PUBLICATIONS

Naumov et al., "Liquid-crystal adaptive lenses with modal control", Optics Letters, vol. 23, No. 13, Jul. 1, 1998, pp. 992-994.
(Continued)

*Primary Examiner* — Michael H Caley
*Assistant Examiner* — Jonathan Y Jung
(74) *Attorney, Agent, or Firm* — Oliff PLC

(57) ABSTRACT

A reflecting cell including at least two substrates each covered by an electrode and facing each other, the substrates delimitating between them a volume which separates them and which is filled with a bistable liquid crystal-type material with a threshold field, for example a cholesteric liquid crystal, both electrodes being intended to be connected to a voltage source. This cell is characterized in that at least one of the electrodes is formed by associating a pattern, which does not entirely cover the surface of the substrate considered, and a conducting layer which covers the surface of the (Continued)

substrate considered, the conductivity of the material of the layer being lower than that of the material of the pattern.

10 Claims, 4 Drawing Sheets

(51) Int. Cl.
*G02F 1/135* (2006.01)
*G02F 1/1335* (2006.01)
*G02F 1/1337* (2006.01)

(52) U.S. Cl.
CPC ........ *G02F 1/1343* (2013.01); *G02F 1/13439* (2013.01); *G02F 1/134309* (2013.01); *G02F 2001/133742* (2013.01); *G02F 2203/30* (2013.01)

(56) References Cited

U.S. PATENT DOCUMENTS

| | | | | |
|---|---|---|---|---|
| 2010/0245695 | A1* | 9/2010 | Kakinuma | C09K 19/52 349/33 |
| 2011/0019111 | A1* | 1/2011 | Morikawa | G02F 1/135 349/2 |
| 2012/0320308 | A1* | 12/2012 | Yeo | G02F 1/167 349/62 |
| 2012/0327351 | A1 | 12/2012 | Fraval et al. | |

OTHER PUBLICATIONS

Jan. 25, 2016 International Search Report issued in International Patent Application No. PCT/FR2015/052843.
Apr. 28, 2015 Search Report and Written Opinion issued in French Application No. 1402485.

* cited by examiner

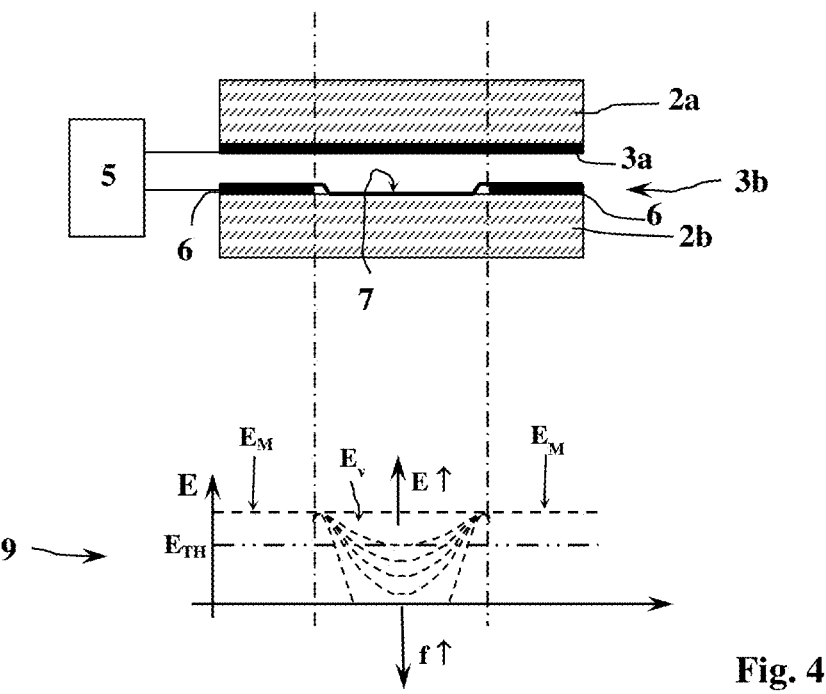
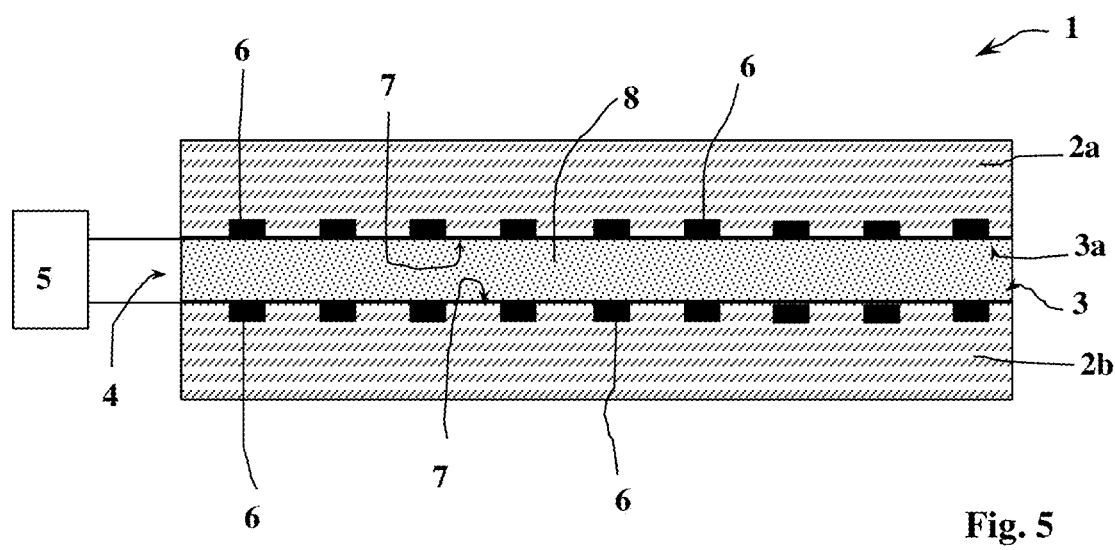
Fig. 5

REFLECTING CELL WITH MODULABLE REFLECTIVITY

The technical field of the invention is that of the bistable liquid crystal-based reflecting cells, for example the cholesteric liquid crystals.

These cells generally comprise two substrates, each covered by an electrode and facing each other. The substrates delimit between them a volume which separates them and which is filled with the bistable liquid crystal.

Such cells are known, for example, by patent WO2012/051127. The cholesteric liquid crystals have the particularity of reflecting the light incident on a part of the visible spectrum which is determined by the type of chiral dopant material associated with the liquid crystal. The other part of the spectrum is transmitted. When these crystals are subjected to an electrical field of a certain level (or threshold field), they change their state and then become entirely transparent.

Due to their transparency, the cholesteric liquid crystal-based cells can thus be stacked above each other in order to constitute polychrome cells allowing to reflect a color which is a combination of at least two elementary colors.

Patents US2006/0066803 and U.S. Pat. No. 7,630,029 thus describe stacks of elementary cells allowing to perform polychrome displays.

A problem with the known cells is the modulation of their reflectivity.

Indeed, it is necessary to gauge the reflectivity of a cell for gauging the level of a given elementary color. The term "grey level" of a cell is commonly used, irrespective of the color of the cell considered.

A conventional solution consists in modulating the value of the electrical field applied to the electrodes.

Indeed, when a cholesteric liquid crystal is in its planar state (where the reflection is at its maximum) and the value of the electrical field is gradually increased, the planar state of the cholesteric crystal has its helical structure destroyed and it passes through a so-called focal conic structure which is transparent and stable.

From this focal conic state and by further increasing the strength of the electrical field, when the field exceeds a threshold field, the liquid crystal aligns with the field and transitions to a homeotropic state which is transparent and unstable.

In this last state, when turning off the electrical field, the cholesteric crystal transitions again to its planar state (high reflection).

In the focal conic state, as from the turning off of the field, this state remains. To bring the crystal back to its planar state, it is required to transition through the homeotropic state, namely to increase the electrical field beyond the threshold field.

It was noted that the focal conic state exhibits a reflectivity rate which decreases when the voltage applied to the electrodes increases (hence, the electrical field increases). It is thus possible to gauge the reflectivity level by adjusting the value of the electrical field, while remaining in all cases with a field lower than the threshold field value which causes the entire material to transition to its homeotropic state. This method is described by patent EP582656.

A drawback of this known method is that the resultant grey level remains difficult to control. The quantity of material, the state of which has changed, for the applied voltage depends not only on the value of the voltage, but also on other structural parameters such as the surface state or the structural defects of the liquid crystal.

The results obtained for the grey level have a low homogeneity, at a cell as well as for several cells associated and subjected to the same field.

It was also suggested to perform a time division multiplexing, namely to change the frequency of the cell control signal for changing, for a given cell, the ratio between the time in the reflecting state and the time in the transparent state. The persistence of vision then allows to perceive the desired grey level, which is no longer a stable state but is a dynamic state related to the frequency of the control signal.

In addition to the complexification of the electrical control and to the need of supplying permanently the cells with power, this method also has the drawback of requiring a liquid crystal material whose the time for switching between the states is shorter than the period of the control signal. But the known materials exhibit a switching time which is too long (about a few tens of milliseconds—to be compared with the video frames which have a duration of 40-60 milliseconds), these switching times further vary with the temperature.

It is also known, by patent US2011/019111, a cholesteric liquid crystal-based display device, which device allows to control the grey level of the cell considered. This device comprises cells comprising in particular transparent electrodes, a cholesteric liquid crystal layer and an intermediary layer. The intermediary layer has a dielectric constant which is different (lower or greater) from that of the liquid crystal. The intermediary layer allows to create areas within the liquid crystal in which the electrical field is stronger for a given voltage. This different field level is associated both to the nature of the layer the dielectric constant of which is different from that of the liquid crystal, and to the thickness of the layer which also affects the level of the field obtained for a given voltage between the electrodes.

Such a solution is complex to implement as it involves the reproducible implementation of patterns having a given thickness and surrounded by the liquid crystal.

Furthermore, the voltage control being performed allows to obtain a predefined number of grey level which depends on the number of different intermediary layers which is implemented. In particular, an intermediary layer allows to obtain only one intermediary grey level, and for having more grey levels, it is required to increase the number of the intermediary layers of different natures, thereby further complicating the implementation of the cell.

The invention is intended to provide a bistable liquid crystal cell for which it is easy to control the resultant "grey level", namely the reflectivity.

The cell according to the invention allows to obtain in a simple manner a grey level which can vary continuously.

Besides, the cell according to the invention can maintain a desired grey level without any permanent power supply. It thus consumes less power and its power supply is simplified.

The invention also relates to a method for modulating the reflectivity of such a reflecting cell.

The cell and the method according to the invention make it possible to make polychrome elementary pixels for a display means. Each elementary color of the pixel can be precisely controlled in terms of reflectivity.

Thus, the invention relates to a reflecting cell comprising at least two substrates, each covered by an electrode and facing each other, the substrates delimitating between them a volume which separates them and which is filled with a bistable liquid crystal-type material with a threshold field, for example a cholesteric liquid crystal, both electrodes being intended to be connected to a voltage source, the cell being characterized in that at least one of the electrodes is formed by associating a pattern, which does not entirely cover the surface of the substrate considered, and a conducting layer which covers the surface of the substrate considered, the conductivity of the material of the layer being lower than that of the material of the pattern.

Advantageously, the pattern will have a surface of between 10% and 60% of the surface of the substrate considered.

The conducting layer could be formed by a deposit of PEDOT-PSS.

The conducting pattern could be formed by a deposit of ITO or of metal.

According to different embodiments, the pattern could be formed by a set of parallel conducting strips, or by at least one quadrilateral, or a grating.

According to another embodiment, each electrode could be formed by associating a pattern, which does not entirely cover the surface of the substrate considered, and a conducting layer which covers the surface of the substrate considered.

The invention also relates to a method for modulating the reflectivity of a reflecting cell according to the invention, which method is characterized in that an alternating electrical voltage is applied between the electrodes of the cell, creating an alternating electrical field between the electrodes, the maximum amplitude of this field being fixed and having a level slightly higher than the threshold field of the bistable liquid crystal, in which method the reflectivity is modulated by selecting the frequency so as to decrease the value of the field below the threshold field at the areas of the liquid crystal which are not covered by the pattern.

According to another embodiment of the method according to the invention, an alternating electrical voltage could be applied between the electrodes of the cell, creating an alternating electrical field between the electrodes, the frequency of the voltage being fixed at a value allowing to decrease the value of the field below the threshold field at the areas of the liquid crystal which are not covered by the pattern when the maximum amplitude of the field has an initial level slightly higher than the threshold field of the bistable liquid crystal, in which method the reflectivity is modulated by selecting a field amplitude which is higher than the initial level so as to also increase the field at the areas of the liquid crystal which are not covered by the pattern and thus bringing this field, within said areas, closer to the value of the threshold field.

The invention will be better understood upon reading the following description of different embodiments, the description being made in reference to the appended drawings in which:

FIG. 4 is a diagram showing the spatial variation of the electric field in a cell according to the invention;

FIG. 5 is a cross-sectional schematic view of a cell according to another embodiment of the invention;

Figure 1:
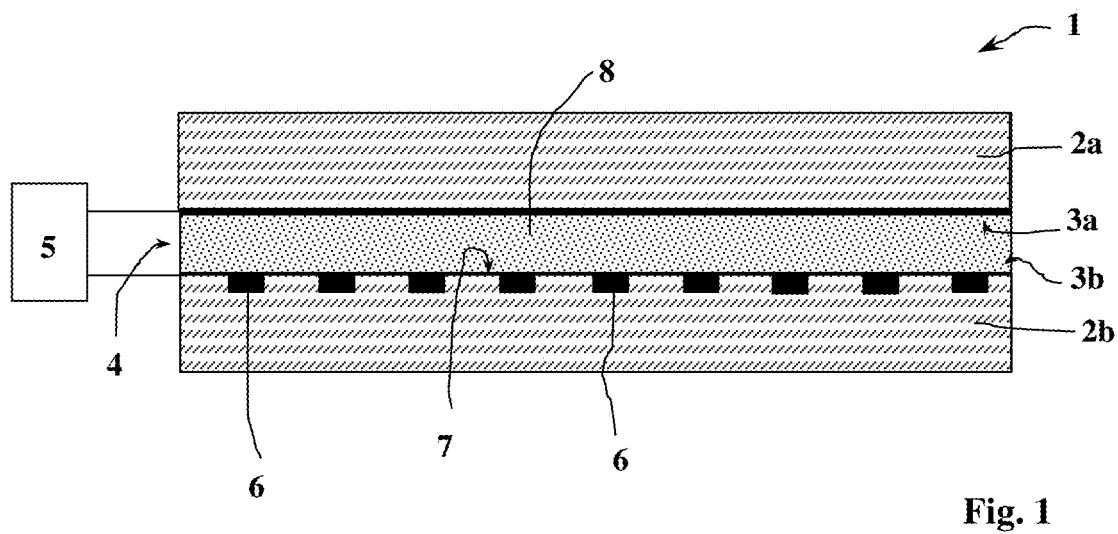
FIG. 1 is a cross-sectional schematic view of a cell according to an embodiment of the invention.

By referring to FIG. 1, a reflecting cell 1 according to an embodiment of the invention comprises two substrates 2a and 2b which each carries an electrode 3a and 3b and are facing each other. The substrates 2a and 2b could be glass slides.

The substrates 2a and 2b delimit between them a volume 4 which separates them and which is filled with a bistable liquid crystal-type material 8 with a threshold field, for example a cholesteric liquid crystal. The liquid crystal 8 is thus interposed between the two substrates 2a and 2b.

Both electrodes 3a and 3b are connected to a voltage source 5, such as an electrical generator, which applies a voltage U between the electrodes 3a and 3b, thereby generating an electrical field E between both substrates 2a and 2b, thus between the two surfaces delimiting the liquid crystal 8.

Conventionally, the cholesteric liquid crystal 8 is a material comprising a helical macroscopic structure with a period P in the absence of an electrical field applied (designated as planar state of the crystal). This material has a nematic phase associated with a chiral dopant allowing to adjust the pitch P of the helix. The wavelength which is reflected by the liquid crystal 8 depends on the pitch P, thus on the chiral dopant used.

The cholesteric liquid crystal assumes, in its idle state, its planar state in which it reflects the light having the wavelength associated with its pitch P ($\lambda = n \cdot P$, expression in which $\lambda$ is the reflected wavelength, n is the mean index of the material, and P is the pitch of the helix).

As previously described, when the value of the electrical field E increases, the liquid crystal transitions from its planar state to a focal conic state in which the helical structures are partially switched (causing the reflectivity to be more reduced) and then to a homeotropic state in which the liquid crystal aligns with the electrical field E and the material is then transparent.

The planar and focal conic states are stable states in which the material remains in the absence of field. The homeotropic state (transparent) is an unstable state requiring the presence of the electrical field.

When the electrical field is turned-off, the material transitions from the homeotropic state to the planar state (maximum reflection coefficient).

$E_{TH}$ will indicate the value of the threshold allowing to transition from the focal conic state to the homeotropic state.

Many documents describe the structures and compositions of the cholesteric liquid crystals and it is thus not necessary to provide more details here.

Reference could be made, for example, to patent WO2012051127 which describes several cholesteric liquid crystals and the associated chiral dopants for different visible wavelengths.

According to the invention, the cell 1 has one of the electrodes, here the electrode 3b, which is formed by associating a pattern 6, which does not entirely cover the surface of the substrate 2b considered, and a conducting layer 7 which covers the surface of the substrate 2b considered as well as the pattern 6.

Obviously, the electrodes 3a and 3b are made of transparent materials. The electrode 3a and the pattern 6 of the electrode 3b are constituted by deposits associating indium oxide ($In_2O_3$) and tin oxide ($SnO_2$). Such a material is commonly designated by the English acronym ITO (Indium Tin Oxide).

The material of the conducting layer 7 will be PEDOT-PSS. PEDOT-PSS refers to a mixture of two polymers, poly(3,4-ethylenedioxythiophene) (or PEDOT) and sodium sulfonate polystyrene (or PSS).

Thus, the conductivity of the material of the conducting layer 7 is lower than that of the material of the pattern 6. The conductivity (often indicated by σ) is expressed in S·cm$^{-1}$ or Siemens per centimeter and is the inverse of the resistivity (often indicated by ρ and expressed in Ω·cm or Ohm× centimeters; σ=1/ρ.

For thin film materials, the electrical resistance properties of the material are generally expressed as the "sheet resistance" (indicated by $R_S$ or $R_\square$). The sheet resistance $R_S$ is equal to the ratio of the resistivity to the thickness e of the layer of the material considered $R_S$=ρ/e. The sheet resistance gives the value of the resistance of a deposit with square surface and thickness e and is expressed in ohms, but is indicated in Ω/☐ (ohm per square) so as to avoid any confusion with the actual resistance. The electrical resistance of the deposit considered between two lateral edges of the deposit is indeed equal to $R_S$ for a square surface, but will be different for a sample which is not square.

A low conductivity thus corresponds to a high resistivity and also to a high sheet resistance.

Saying that the conductivity of the material of the conducting layer 7 is lower than that of the material of the pattern 6 thus means that the sheet resistance of the material of the conducting layer 7 is higher than the sheet resistance of the material of the pattern 6.

Thus, the sheet resistance $R_S$ of ITO is about 10 to 100Ω/☐ while the sheet resistance $R_S$ of PEDOT-PSS is about 10 MΩ/☐ (mega Ohms/square).

This difference in conductivity allows to ensure an electrical field gradient in the volume 4 when applying an alternating voltage between the electrodes. The gradient further depends on the frequency of the electrical signal: the higher the frequency is, the less the electrical signal could propagate within the cell.

Figure 6:
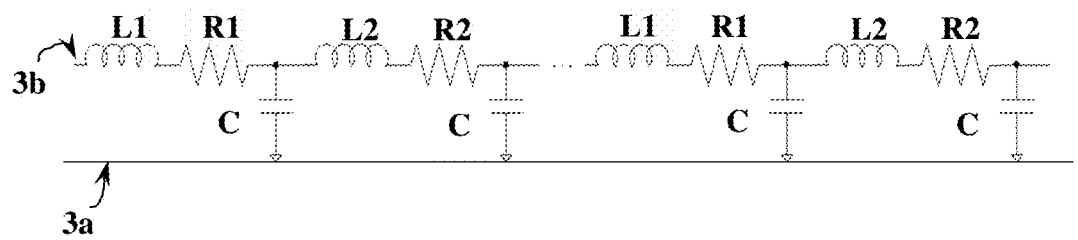
FIG. 6 is an electrical diagram corresponding to the cell according to the invention.

It is well known that the assembly of a cholesteric liquid crystal between two conducting electrodes constitutes a capacity. FIG. 6 (extracted from the publications well known by the one skilled in the art) shows the conventional diagram of such an assembly. The capacity C is that of the condenser formed by the liquid crystal 8. The resistances R1 illustrate those of the areas covered by the conducting pattern 6 and the resistances R2 illustratet those of the areas covered by the sole conducting layer 7. The inductances L1 and L2 associated with R1 and R2 are shown here, but often are negligible.

Such an association of LC circuits has a behavior in terms of voltage drop which highly depends on the frequency of the voltage.

The publication: "Liquid Crystal adaptative lenses with modal control" of A. F. Naumov, Yu Loktev, I. R. Guralnik and G. Vdovin (Optic letters/Vol 23/no 13/Jan. 7, 1998, describes a liquid crystal-based lens with a variable focal length, in which a liquid crystal is arranged between two electrodes, one of the electrodes carrying an annular contact delimitating a transparent opening carrying a highly resistive electrode. This publication shows that, when the voltage has a given frequency, the electrical field in the liquid crystal has a substantially parabolic shape between the highly conducting electrodes. The authors use this field variation which depends on the frequency, to provide different focal distance characteristics to the lens thus realized.

This phenomenon of variation of the field within a liquid crystal and according to the frequency is also described in patent FR2957684, still as part of an application to the manufacturing of a lens with a variable focal length.

These physical phenomena well known and already modeled are used by the present invention with a bistable liquid crystal material with a threshold field (for example, cholesteric).

It does not result in a collimation, but in a variable grey level when the voltage is turned-off, the grey level being dependent on the frequency of the voltage which has been applied. As an alternative, the pattern 6 could be made of a metal oxide such as tin oxide doped with aluminum (AZO) or of a metal material, for example a thin array of silver wires. In the case of a metal deposit, the number and the thickness of the wires will be selected so as not to interfere with the transparency of the cell 1.

Figure 2:
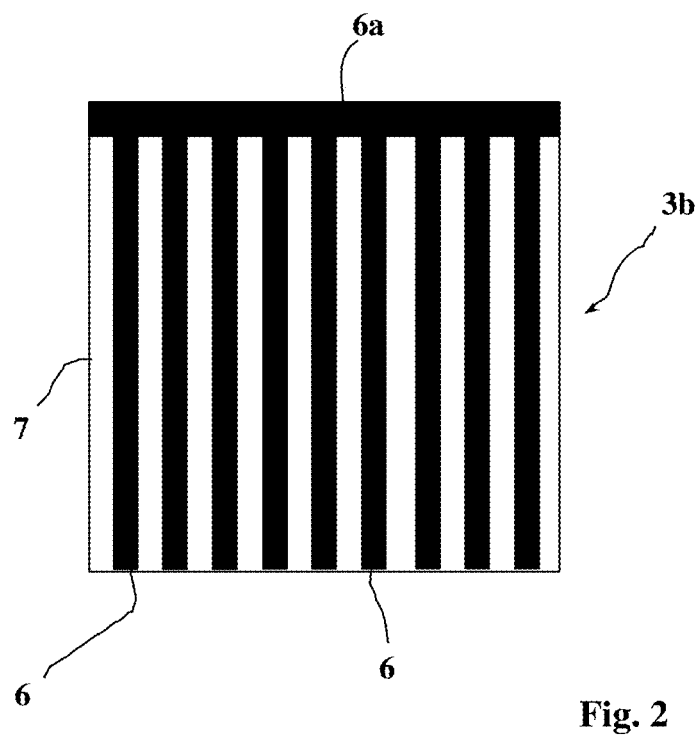
FIG. 2 is a front view of an embodiment of an electrode of the cell according to the invention.

FIG. 2 shows, in a front view, an embodiment of the electrode 3b. It can be seen that the pattern 6 is here formed by a set of parallel conducting strips which all are connected by a bar 6a made of the same conducting material as the remaining part of the pattern 6.

Such a pattern 6 is easy to realize by etching the substrate 2b and then vacuum-depositing the conducting material (ITO).

The conducting layer 7, which covers both the pattern 6 and the surface of the substrate 2b which does not carry the pattern 6, is then deposited. The deposit of the layer 7 of PEDOT-PSS is performed by spin coating. This deposit mode enables to ensure the implementation of a conducting layer with an uniform thickness and a homogeneous composition. An uniform thickness and a homogeneous composition enable to ensure an uniform distribution of the conductivity of the layer 7.

It will be noted that the etching of the pattern 6 and then the thin film deposit of the conducting layer 7 result in a cell in which the thickness of the liquid crystal 8 is uniform for the entire cell (thickness of the liquid crystal of about 4 micrometers). Thus, there is no spatial variation of the capacity of the condenser formed by the electrodes and the liquid crystal within the cell, as it was the case in patent US2011/019111. In particular, FIG. 4 is a schematic representation of the cell 1 in which the thick lines representing the pattern 6 and the thin line of the conducting layer 7 are independent of the actual thicknesses. The thickness of the liquid crystal 8 is constant in relation both to the pattern 6 and to the conducting layer 7 outside the pattern 6 (about 4 micrometers). It is also the case in FIGS. 1 and 5.

FIG. 4 shows, in a cross-sectional view, a part of the cell 1. The electrical generator 5 connects the electrode 3a and the electrode 3b, namely both the pattern 6 (only two strips are shown here) and the conducting layer 7.

The generator 5 applies between the electrodes 3a and 3b an alternating electrical voltage which creates an alternating electrical field E between these electrodes 3a and 3b. The maximum amplitude of this field E is selected with a level slightly higher than the threshold field $E_{TH}$ of the bistable liquid crystal 8.

The curve 9 which is positioned below the diagram of the cell 1 enables to show (dotted lines) the spatial distribution of the electrical field within the liquid crystal 8.

It is noted that, with respect to the patterns 6, the electrical field $E_{TH}$ is at its maximum due to the conductivity of the materials forming the pattern 6 and the electrode 3a. The crystal transitions to the homeotropic state (transparent) in these areas facing the pattern 6.

It is also noted that the electrical field $E_V$ has a variable level which is lower or equal to the maximum field $E_M$ in the area of the crystal 8 which is located between the strips of the pattern 6. Indeed, in theses areas, the electrodes which face each other are, on one hand, the highly conducting electrode 3a and, on the other hand, the conducting layer 7 which has a lower conductivity. The value of the electrical field $E_V$ in this area varies with the frequency of the voltage which is applied to the electrodes 3a,3b.

For a zero frequency (direct current), the field $E_V$ is equal to the maximum field $E_M$. For a higher frequency, the field $E_V$ decreases and this field is as much low as the frequency is high. The arrow f↑ in FIG. 4 illustrates the gradual movement of the field layers (shown in dotted lines) with the increase in frequency f.

It can be noted that, for some frequencies, the amplitude of field $E_V$ becomes lower than the amplitude of threshold field $E_{TH}$, which means that the cholesteric liquid crystal 8 transitions to its focal conic state which is stable. Thus, when turning off the current, the cell will have one part of the liquid crystal 8 which will be in the planar state (the crystal that was facing the pattern 6) and one part of the liquid crystal which will be in the focal conic state (transparent), which part is located longitudinally between the strips of the pattern 6.

Thus, the reflectivity of the cell will be lower than 100% for the light frequency associated therewith.

The reflectivity rate (grey level) of the cell can thus be adjusted by changing the frequency of the voltage supplied by the generator 5.

It is noted that, due thanks to the invention, one does not depend on controlling the behavior of the whole layer of the liquid crystal 8 in a domain for which 30 the magnitude of the electric field is lower than the magnitude of the threshold field.

On the contrary, a part of the liquid crystal volume which will systematically be reflective, is entirely controlled, as it is subjected to a field higher than the threshold field (the part which is located below the pattern 6).

The part of the liquid crystal whose reflectivity is adjusted is the one located between the areas of the pattern 6. A preliminary calibration of the cell enables to control its behavior according to the variation of the frequency.

Furthermore, compared to the known time division multiplexing methods, one no more depends, for gauging the grey level of the cell, on the switching dynamics of the liquid crystal 8. The dynamic behavior of the crystal is no longer a technical obstacle for ensuring a modulation of the grey level of the cell. Furthermore, the grey level is kept after the power supply is turned-off.

It can be seen that the cell will have, according to the frequency selected, a maximum reflectivity (zero frequency) or a minimum reflectivity which will depend on the ratio between the surface covered by the pattern and the surface not covered by the pattern (maximum frequency).

Thus, the level of the minimum reflectivity will depend on the ratio of the surface of the pattern 6 to the surface of the substrate 3b on which it is applied.

The invention further enables to obtain a grey level which is continuously variable by changing the frequency level. Thus, one no more depends on the multiplication of the patterns, as it was the case with patent US2011/019111.

However, it is still possible to obtain a zero reflectivity by applying to the electrodes a voltage such that the electrical field is lower than the threshold field $E_{TH}$. In this case, the liquid crystal assumes a focal conic state, also where it faces the pattern 6.

The freedom of settings is thus particularly high.

The pattern will be defined according to the contrast characteristics commonly desired for the cell, but also according to the size of the pattern to be displayed and according to the observation distance. The maximum frequency of use will also affect the dimensional characteristics of the patterns.

In order to maximize the modulation of reflectivity, it will be necessary to minimize the width of the conducting tracks.

A surface ratio of about 50% between the surface covered by the pattern and the surface of the substrate provides a reflectivity capacity comprised between 50% and 100% (with still the possibility to have a zero reflectivity).

Thus, it will be possible to select a surface covered by the pattern, which is comprised between 10% and 60% of the surface of the substrate considered.

As an example, a cell according to the invention has been made, in which the pattern is of the type shown in FIG. 2 and formed by conducting strips of ITO and covered with a homogeneous and uniform conducting layer 7 of PEDOT-PSS covering the whole surface of the substrate 2b. The layer 7 is deposited by spin coating on the substrate carrying the etched pattern 6. The thickness of the layer of liquid crystal 8 is constant and equal to 4 micrometers.

The electrical properties of the cell are as follows:
Sheet resistance of the pattern 6: $R_{S6}=20$ Ω/□
Sheet resistance of the layer 7: $R_{S7}=1.5$ Mega Ω/□
Capacity of the liquid crystal 8: $C=10^{-5}$ F/m$^{-2}$.

The threshold field is obtained on such a cell by applying between the electrodes 3a and 3b an alternating voltage whose maximum amplitude is slightly lower than 30 volts.

For the experiment, an alternating voltage of 30 volts (thus creating a field whose maximum amplitude is higher than the threshold field) and at different frequency levels have been applied to this cell, and the signal was stopped in order to observe the obtained reflectivity state of the cell.

In each case, the grey level or the reflectivity obtained is considered in % of grey level or % of reflectivity. A reflectivity or grey level of 100% corresponds to a crystal which entirely transitioned to the planar state. A reflectivity or grey level of 0% corresponds to a crystal which entirely remained in the focal conic state (transparent).

Figure 7A:
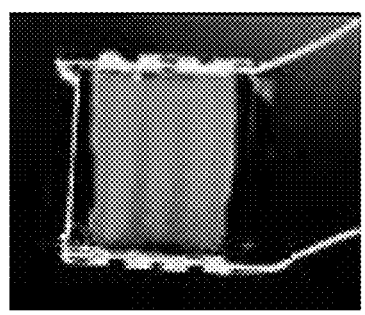
FIGS. 7a,7b,7c,7d and 7e are photographs enabling to visualize the grey levels obtained for different levels of signal frequency.
Figure 7B:
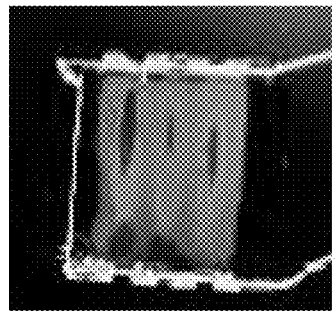
Figure 7C:
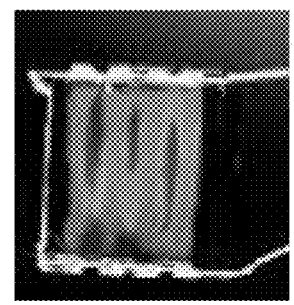
Figure 7D:
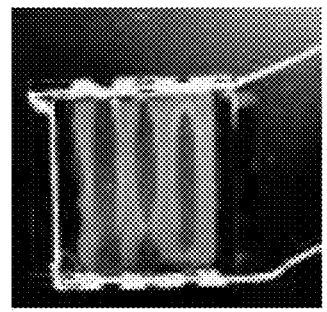

FIGS. 7a,7b,7c and 7d are photographs showing the reflectivity states obtained (alternating voltage of 30 volts):

FIG. 7a after applying a signal of 5 kHz frequency, grey level 100% (maximum reflectivity);

FIG. 7b after applying a signal of 10 kHz frequency, grey level 90%;

FIG. 7c after applying a signal of 15 kHz frequency, grey level 80%;

FIG. 7d after applying a signal of 20 kHz frequency, grey level 50% (halved reflectivity).

Figure 7E:
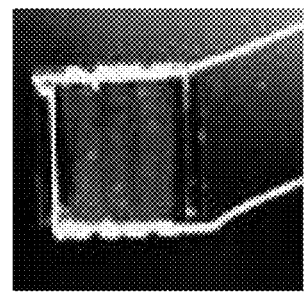

FIG. 7e is a photograph showing the reflectivity state obtained after applying an alternating voltage of 25 volts (thus creating a field whose maximum amplitude is lower than the threshold field).

The field obtained is then lower than the threshold field for the whole cell and the grey level is 0% (zero reflectivity). The crystal remains in the focal conic state, thus transparent.

The photograph 7e has been obtained with a signal frequency of 30 kHz, but the same state would have been obtained for any other frequency, since the field generated for the voltage of 25 volts is still lower than the threshold field of the crystal.

As an alternative, it is possible to modulate the reflectivity of the reflecting cell by applying between the electrodes of the cell an alternating electrical voltage of a fixed frequency. In this case, it is the amplitude of the voltage that is varied (thus, the amplitude of the electrical field E), but not the frequency.

Obviously, this electrical field should always have a level slightly higher than the threshold field of the bistable liquid crystal.

The distribution of the electrical field is changed again by the presence of high reflectivity areas between the arms of the pattern 6.

A sufficiently high operating frequency will be selected such that the field between the arms of the pattern 6 is at its minimum for a given initial field amplitude which is higher than the threshold field $E_{TH}$.

The increase in the field amplitude will thus cause the increase in the field between the arms of the pattern 6. The arrow E↑ in FIG. 4 illustrates the gradual movement of the field layers (shown in dotted lines) with the increase in the amplitude of the field E.

It is obviously possible to provide the pattern 6 with different shapes.

Figure 3A:
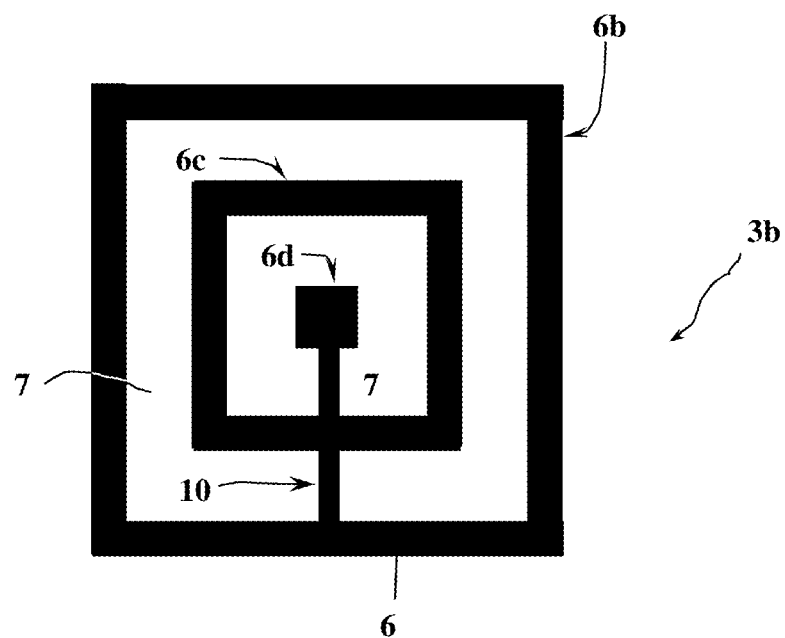
FIGS. 3a and 3b are front views of other embodiments of an electrode of the cell according to the invention.

FIG. 3a thus shows a pattern 6 which is formed by three quadrilaterals having the same symmetry axes: a peripheral square 6b formed by four conducting bars etched on the substrate, a median square 6c also formed by four conducting bars, and a middle square 6d in the form of a simple etched block. The conducting layer 7 covers the whole substrate as well as the different quadrilaterals 6a, 6c and 6d. Obviously, the quadrilaterals will be connected with each other at the voltage source so as to have the same electrical potential. The connection could be made by a conducting track 10 made of the same conducting material as the quadrilaterals 6a, 6c and 6d.

Figure 3B:
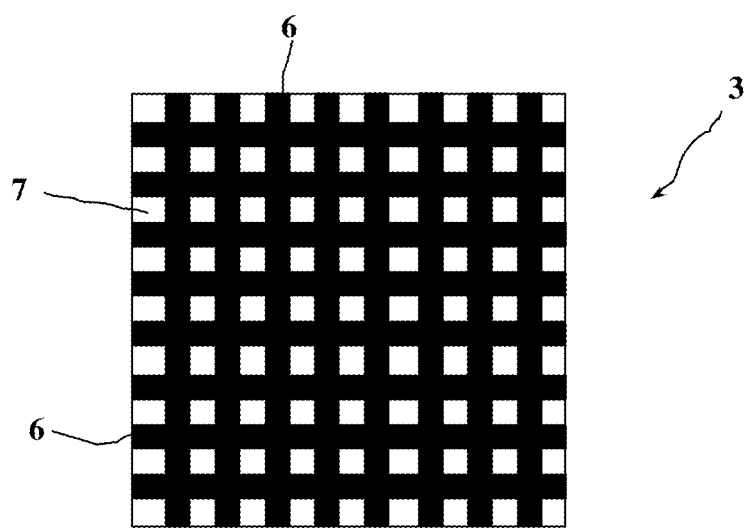

FIG. 3b shows a pattern which has the shape of a grating 6 comprising bars orthogonal to each other. The grating 6 could be formed more simply by an array of conducting lines obtained by etching a thin metal layer on the substrate.

FIG. 5 shows another embodiment of the invention which differs from that of FIG. 1 in that each substrate 2a,2b carries an electrode 3a or 3b which is formed by associating a pattern 6, which does not entirely cover the surface of the substrate considered, and a conducting layer 7 covering the surface of the substrate considered.

The conductivity of the material of each layer 7 is lower than that of the material of the pattern 6 associated.

The advantage of this configuration is that the effect obtained is more pronounced: there is a higher variation of the electrical field with the frequency.

However, this embodiment will require a more precise assembly of the two plates so as to correctly position the electrodes facing each other.

The invention claimed is:

1. A reflecting cell comprising:
   a first substrate and a second substrate facing each other;
   a first electrode in direct contact with the first substrate and configured to be connected to a voltage source;
   a second electrode in direct contact with the second substrate and configured to be connected to the voltage source, the second electrode comprising:
     a pattern that is in direct contact with the second substrate and does not entirely cover a surface of the second substrate; and
     a conducting layer that covers the surface of the second substrate and the pattern, a conductivity of a material of the conducting layer being lower than a conductivity of a material of the pattern; and
   a volume that is delimited between and separating the first substrate and second substrate, the volume being filled with a bistable liquid crystal-type material with a threshold field.

2. The reflecting cell according to claim 1, wherein the pattern has a surface area that is between 10% and 60% of a total surface area of the second substrate.

3. The reflecting cell according to claim 1, wherein the conducting layer is composed of PEDOT-PSS.

4. The reflecting cell according to claim 3, wherein the pattern is composed of ITO or of metal.

5. The reflecting cell according to claim 1, wherein the pattern is composed of a set of parallel conducting strips.

6. The reflecting cell according to claim 1, wherein the pattern is composed of at least one quadrilateral.

7. The reflecting cell according to claim 1, wherein the pattern is composed of a grating.

8. The reflecting cell according to claim 1, wherein the first electrode comprises:
   a pattern that is in direct contact with the first substrate and does not entirety cover a surface of the first substrate; and
   a conducting layer that covers the surface of the first substrate and the pattern of the first electrode, a conductivity of a material of the conducting layer of the first electrode being lower than a conductivity of a material of the pattern of the first electrode.

9. A method for modulating a reflectivity of the reflecting cell according to claim 1, comprising:
   applying an alternating electrical voltage between the first electrode and the second electrode, creating an alternating electrical field between the first electrode and the second electrode, a maximum amplitude of the alternating electrical field being fixed and having a level higher than an amplitude of the threshold field; and
   modulating the reflectivity by selecting a frequency of the alternating electrical voltage so as to decrease an amplitude value of the alternating electrical field below the amplitude of the threshold field in areas of the liquid crystal not covered by the pattern.

10. A method for modulating a reflectivity of the reflecting cell according to claim 1, comprising:
    applying an alternating electrical voltage between the first electrode and the second electrode, creating a first alternating electrical field between the first electrode and the second electrode, a frequency of the alternating electrical voltage being fixed at a value such that an amplitude value of the first alternating electrical field falls below an amplitude of the threshold field in areas of the liquid crystal not covered by the pattern when a first maximum amplitude of the first alternating electrical field is higher than the amplitude of the threshold field; and
    modulating the reflectivity by applying a second alternating electrical field having a second maximum amplitude which is higher than the first maximum amplitude so as to increase the alternating electrical field amplitude at the areas of the liquid crystal not covered by the pattern and thus bring the alternating electrical amplitude, within those areas, close to the amplitude of the threshold field.

* * * * *